March 3, 1936.　　H. M. KILPATRICK　　2,032,369
LAWN OR GARDEN SPRINKLER
Filed Dec. 8, 1931
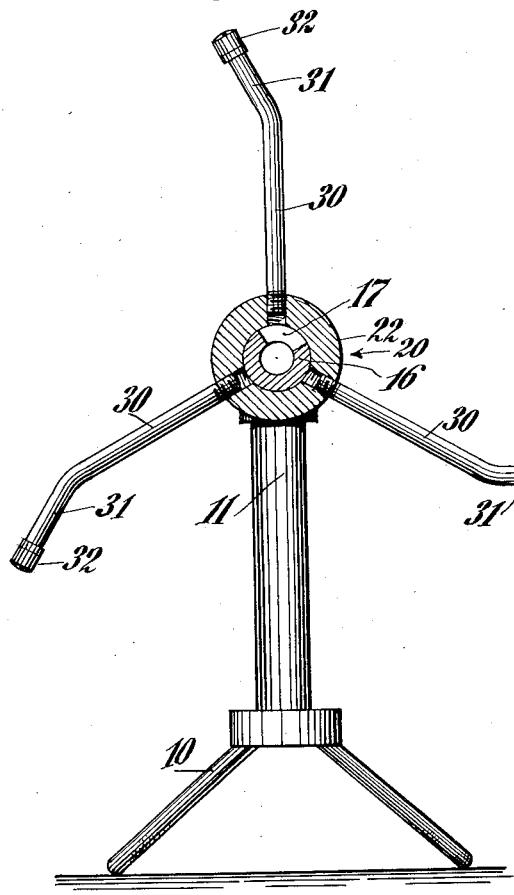
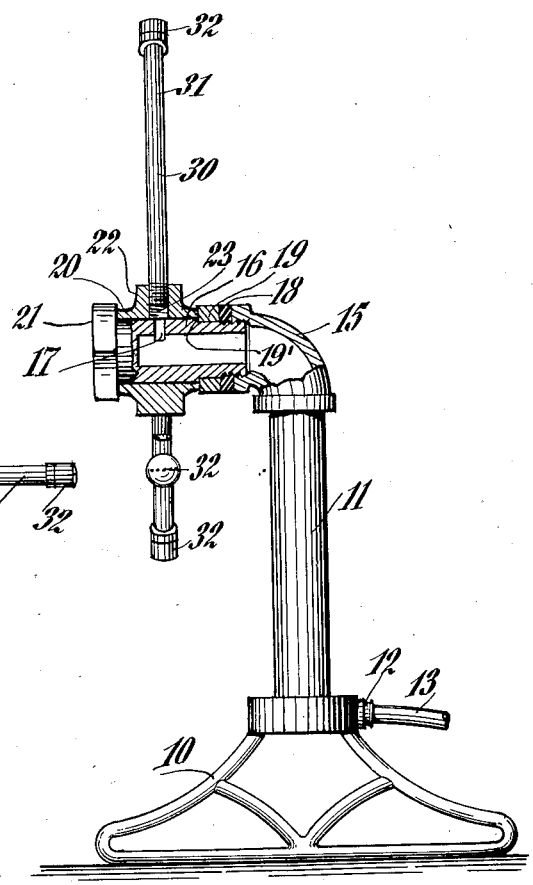
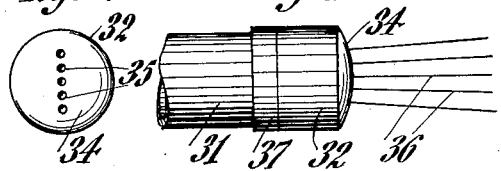
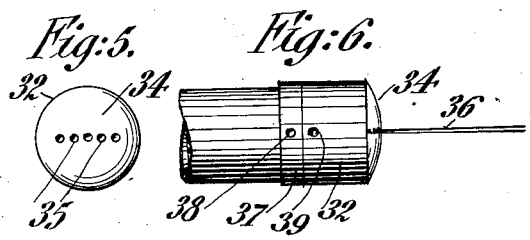
INVENTOR
Howard M. Kilpatrick Patented Mar. 3, 1936

2,032,369

UNITED STATES PATENT OFFICE 2,032,369

LAWN OR GARDEN SPRINKLER

Howard M. Kilpatrick, New York, N. Y.

Application December 8, 1931, Serial No. 579,713

16 Claims. (Cl. 299—69)

This invention relates to lawn or garden sprinklers of the type having continuously moving nozzles and to sprinklers adapted for sprinkling long straight narrow areas from a single setting of the sprinkler, though it is noted that the invention as defined in some of the claims is not limited to lawn or garden sprinklers, nor in some respects to sprinklers for long narrow areas.

One object of the invention is to provide a sprinkler of this kind which is cheaper and simpler in construction and simpler in operation than heretofore known sprinklers of this type.

Another object of the invention is to provide an apparatus or device of this kind having very simple means for adjusting the sprinkler for sprinkling areas of different widths.

Another object of the invention is to provide an apparatus or device of this kind having a very small number of parts and no gears and pistons, and which will not wash holes in the ground when in use.

Other objects of the invention are to improve generally the simplicity and efficiency of such devices and to provide a device or apparatus of this kind which is durable, economical to manufacture and operate and which will not get out of order.

Still other objects of the invention will appear as the description proceeds; and while herein details of the invention are described and claimed, the invention is not limited to these since many and various changes may be made without departing from the scope of the invention as defined in the broader claims.

The inventive features for the accomplishment of these and other objects are shown herein in connection with an improved sprinkler which, briefly stated, includes a stand pipe carrying a horizontal tubular shaft closed at its outer end and provided intermediately with an arcuate slot-like port running less than half way around the shaft at approximately the upper quarter thereof and rotatably receiving a hub rotatably disposed on said shaft in a substantially water-tight manner, and provided intermediately with a plurality of radial openings adapted successively to register with said port and receiving annular arms disposed in the same vertical plane of rotation. Said arms have their outer end portions slightly backwardly bent and providing with nozzle caps rotatably adjustably secured thereon, each cap being provided at its outer end face with a row of divergent nozzle orifices adapted to discharge streams of water which are laterally divergent when the rows are horizontal, thereby to sprinkle a wide path, and to discharge said streams in said vertical plane when the caps are so adjusted that the rows are disposed in said planes, thereby to sprinkle a narrow path.

In the accompanying drawing,

Fig. 1 is a front elevation, partly in transverse vertical section, showing the complete sprinkler;

Fig. 2 is a side elevation of the sprinkler, partly in vertical axial section;

Figs. 3 and 4 are end and side elevations showing a nozzle in position for sprinkling a narrow path; and Figs. 5 and 6 are side and end elevations showing the nozzle in position for sprinkling a wide path.

The sprinkler is carried on a stand comprising a base 10, a stand pipe 11 supported thereon, and a hose coupling 12 for establishing communication between the stand pipe and a hose 13.

An elbow 15 on the upper end of the stand pipe supports a horizontal tubular shaft screwed into the elbow and provided with a closed outer end and intermediately with an arcuate port 17 running less than half way around the shaft at approximately the upper quarter thereof. A rubber washer 18 is disposed on the shaft and compressed between the elbow 15 and a collar 19 engaging against a shoulder 19' on the shaft.

A hub 20 rotatably disposed on said shaft in engagement with said collar 19 and a hexagonal head 21 on the outer end of the shaft, is provided intermediately with an annular rib 22 through which pass radially threaded openings 23 adapted successively to register with said arcuate port 17 as the hub rotates.

A plurality of tubular arms 30 respectively screwed into said openings 23 are all disposed in the same vertical plane of rotation. Their outer end portions 31 are screw-threaded and slightly backwardly bent in said plane and carry internally threaded nozzle-caps 32 rotatably adjustably screwed on said outer end portions. Each nozzle cap is provided at its outer end face 34 with a row of divergent nozzle orifices 35 adapted to discharge streams of water which are laterally diverged when the rows are horizontal or transverse to said vertical plane as in Fig. 5, said streams 36 being all in said vertical plane if said rows are disposed in said plane as in Fig. 3. Means such, for instance, as internally threaded lock collars 37 on said end portions engage with the nozzle-caps to lock the latter in adjusted position with said rows either transverse or coincident with said plane, as just explained. The collars and nuts are shown provided with lateral holes 38 and 39 for the reception of a tool for adjusting them.

The arcuate port 17 is so disposed as to register with said arms when the nozzle-caps 32 point slightly or fully upwardly, thereby to permit the streams to be discharged somewhat above the level of the hub, but are terminated so as to be entirely out of register with the arms when the nozzle-caps point at all downwardly, thereby to prevent the downward discharge of the streams 36 to prevent the working of holes in the ground or any excessive discharge of water at and near the sprinkler.

The operation of the sprinkler is very simple, and is obvious from the foregoing. When it is desired to sprinkle a long narrow area, the sprinkler is set about in the axis of the long area, with axis of rotation of the arms transverse to said long area. Then the water is turned on. If the area to be sprinkled is narrow the row of orifices is turned to coincide with the plane of rotation; if said area is wide, the row of orifices is turned transverse to said plane; if the area has an intermediate width, the row of orifices is turned to an intermediate angle. If the area is very long, the sprinkler may be from time to time moved to sprinkle successive portions of the long area.

While herein the port 17 is shown continuous and of uniform width as distinguished from being interrupted or tapering in either direction at any point, as for interrupting or changing the amount of flow at any point, it is understood that the invention is not so limited.

The claims herein are in part copied from my allowed application, Serial No. 46,095, filed July 25, 1925, and allowed December 20, 1930, which application shows the general combination shown herein. Therefore, the present application is a continuation in part of said allowed application.

I claim as my invention:

1. In a sprinkler, a completely revolving arm mounted to move in a fixed vertical plane; a nozzle on said arm adjustable to discharge water in a narrow path or a wide path; and means for supplying water to said arm only when said nozzle points upwardly.

2. In a sprinkler, revolving arms mounted to move in a constant vertical plane; means for admitting water to said arms only when the arms point upwardly and to withhold water from the arms when the latter point downwardly; and nozzles on the end of the arms adjustable to discharge water in said plane or to discharge the water at an angle to the plane.

3. In a sprinkler, a freely revolving arm mounted to move in a constant vertical plane; means for admitting water to said arm only when the arm points upwardly and to withhold water from the arm when the latter points downwardly; and a nozzle cap on the end of the arm having a row of orifices and rotatably adjustable to discharge water in said plane or to discharge the water at angles to the plane.

4. In a sprinkler, a constantly freely revolving arm mounted to move in a single vertical plane; means for admitting water to said arm; and a nozzle cap on the end of the arm having a row of orifices and rotatably adjustable to discharge water in said plane or to discharge the water at angles to the plane.

5. In a sprinkler, revolving arms supported to move in a single vertical plane; means for admitting water to said arms only when the same point upwardly and to withhold water from the arms when the latter point downwardly; and nozzle caps rotatably adjustable on the free ends of the arms each provided at its outer end face with a row of divergent nozzle orifices adapted to discharge streams of water which are laterally divergent when the row is horizontal, and to discharge said streams in said vertical plane when the row is disposed in said plane.

6. In a sprinkler, revolving arms adapted to move and spray in the same constant vertical plane; nozzles on said arms adjustable to discharge water in a narrow path or a wide path; and means for supplying water to said arms only when said nozzles point upwardly.

7. In a sprinkler, a completely revolving nozzle mounted to spray and confine its spray within a stationary substantially vertical plane, said nozzle being adjustable to confine the spray to a narrow path or a wide path.

8. In combination, a nozzle movable about a horizontal axis and having orifices directing liquid in a common stationary vertical plane and also exterior to said plane; and means for causing all of said orifices to direct their spray in said common plane.

9. A lawn sprinkling apparatus comprising a supporting means; liquid directing means positioned by the supporting means and operable by liquid passing to said means when thus positioned, to at times point said means upwardly and at times approximately vertically downwardly; means for supplying liquid to the directing means, the directing means directing streams upwardly when the latter is pointing upwardly; and means for preventing the projection of streams from the apparatus whenever the directing means points downwardly, thereby to prevent the downwardly pointing means from directing streams into the ground, thereby to prevent the digging of holes in the ground by the streams.

10. A lawn sprinkling apparatus comprising a supporting means; a shaft thereon positioned by the supporting means with its axis in a non-vertical position; liquid directing means completely revoluble on said shaft around said axis and adapted as the shaft is thus positioned and said means revolves to point upwardly and approximately vertically downwardly toward the ground near the apparatus; means supplying liquid to the directing means, the directing means being adapted to direct streams upwardly when the directing means is pointing upwardly; means operable by the liquid passing through the directing means for revolving the directing means; and means for preventing the directing means from projecting streams from the apparatus when the directing means is pointing downwardly, thereby to prevent the digging of holes in the ground.

11. A lawn sprinkling apparatus comprising a supporting means; a shaft positioned by said means with its axis substantially horizontal; liquid directing means completely revoluble on said shaft around said axis and adapted to project upwardly directed streams while the means is revolving in a constant direction; and means for preventing the directing means from projecting streams completely from the apparatus except in an upward direction, whereby the apparatus is prevented from digging holes in the ground.

12. A sprinkling apparatus for agricultural and other purposes, said apparatus comprising a support; a shaft positioned by said support with its axis substantially horizontal, liquid directing means completely revolvable on said shaft around said axis, and adapted to project upwardly directed streams forwardly and rearwardly of, and above, said shaft while the means is revolving in a constant direction; and means for preventing the directing means from projecting streams completely from the apparatus except in an upward direction; said apparatus being substantially free of structures above said directing means, which, if present, would prevent the free projection and falling of said streams; said directing means directing streams in a direction to cause the reaction thereof to revolve the directing means in said constant direction.

13. In a lawn sprinkler, revolving nozzles mounted to revolve in a single verticle plane, around an axis and directed in a direction to cause the nozzles to revolve around said axis by reaction, and means supplying water to the nozzles when the nozzles point upwardly and holding the water from the nozzles when the nozzles point downwardly.

14. A lawn sprinkling apparatus comprising revolving arms mounted to move in a constant vertical plane; nozzles on said arms adapted to discharge water in a wide path and in a direction to cause said arms to revolve by reaction; and means for supplying water to said arms only whenever said nozzles point upwardly.

15. A lawn sprinkling apparatus comprising liquid directing means movable in an endless path and adapted while in one part of the path to direct the liquid if present upwardly substantially coincident with a stationary vertical plane; and means for supplying liquid to the directing means only when the directing means is directing the water upwardly in said plane, said directing means directing streams in a direction to cause said directing means to move by reaction along said path.

16. A lawn sprinkling apparatus comprising nozzles completely revolvable about a horizontal axis and constructed to direct spray in a direction to cause the nozzles to revolve around said axis by reaction and to direct spray substantially in a single vertical plane and to confine the spray in said vertical plane; said nozzles operating to produce, and confine the spraying to, a long very narrow sprayed area, the boundaries on both sides of said sprayed area between the sprayed area and the surrounding unsprayed area being substantially straight.

HOWARD M. KILPATRICK.